(12) United States Patent
Kadoi et al.

(10) Patent No.: US 7,483,166 B2
(45) Date of Patent: Jan. 27, 2009

(54) INFORMATION PROCESSING APPARATUS AND PRINT PREVIEW DISPLAY METHOD

(75) Inventors: Yurika Kadoi, Kanagawa (JP); Shinichi Yuga, Kanagawa (JP); Nobushige Aoki, Kanagawa (JP); Noriaki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1016 days.

(21) Appl. No.: 10/820,197

(22) Filed: Apr. 8, 2004

(65) Prior Publication Data

US 2004/0207859 A1 Oct. 21, 2004

(30) Foreign Application Priority Data

Apr. 17, 2003 (JP) ............................. 2003-112867

(51) Int. Cl.
*G06F 15/00* (2006.01)
*G06K 1/00* (2006.01)
*G06K 15/10* (2006.01)

(52) U.S. Cl. ..................... 358/1.18; 715/274; 715/247

(58) Field of Classification Search ................ 358/1.18; 715/274, 574, 247; 710/129
See application file for complete search history.

(56) References Cited

U.S. PATENT DOCUMENTS

| 2001/0044868 A1* | 11/2001 | Roztocil et al. ............. 710/129 |
| 2004/0205641 A1* | 10/2004 | Shimizu ..................... 715/527 |

FOREIGN PATENT DOCUMENTS

| JP | 10-187401 A | 7/1998 |
| JP | 2001-67347 A | 3/2001 |
| TW | 325548 A | 1/1998 |

* cited by examiner

*Primary Examiner*—Twyler L Haskins
*Assistant Examiner*—Nicholas C Pachol
(74) *Attorney, Agent, or Firm*—Fitzpatrick, Cella, Harper & Scinto

(57) ABSTRACT

Disclosed is an information processing apparatus for implementing a print preview display of print data that is to be printed, the apparatus including an acquisition unit for acquiring amount of offset of a page in a print preview, a preview image generating unit for generating a print preview image of the print data, and a preview display control unit for causing the preview image display, which is generated by the preview image generating unit, to be offset and displayed for every sheet of paper in a case where the print data is to be printed on a plurality of sheets of paper, based upon amount of offset acquired by the acquisition unit. Also disclosed is an information processing apparatus for implementing a print preview display of print data that is to be printed, the apparatus including an image creating unit for creating preview images obtained by superimposing images of sheets of paper, on which the print data is to be printed, upon offsetting the images of the sheets of paper by a specified amount of offset, and a display unit for displaying the preview images created by the image creating unit.

15 Claims, 10 Drawing Sheets

PAPER SIZE(Z): A4  ▼ 401

PRINTING ORIENTATION: ⦿ PORTRAIT(T)   ○ LANDSCAPE(D) ~402

PAPER TYPE(U): PLAIN PAPER  ▼ 403

LAYOUT: SCALE: 100%  ▼ 404

PRINT IMAGE:
LTcorner.bmp
main.bmp
media.bmp ~405

FILE LOCATION: LOCAL DISK(C:) ▼

ADD    DELETE

NUMBER OF COPIES(C): 1  COPIES (1-999) ~406

☐ PRINT IN REVERSE ORDER(R)  ☐

INFORMATION PROCESSING APPARATUS AND PRINT PREVIEW DISPLAY METHOD

FIELD OF THE INVENTION

This invention relates to print preview display and, more particularly, to an information processing apparatus and print preview display method for implementing print preview display in a case where print information to be printed extends over a plurality of sheets.

BACKGROUND OF THE INVENTION

A technique for creating a print preview image based upon device information and text data and displaying, side by side, one page of print preview and defect information with regard to the page has been proposed (for example, see the specification of Japanese Patent Application Laid-Open No. 2001-067347). This specification also describes a technique for laying out and displaying print previews of all pages, taking into consideration both the front and back sides of each page, in such a manner that the previews will not overlap.

Also proposed is a technique in which when rendering information is stored page by page and transmitted to an output unit, output images are displayed one page at a time in conformity with the progress of printing (for example, see the specification of Japanese Patent Application Laid-Open No. 10-187401).

In addition, there are occasions where word processing programs and the like have a print preview function that causes the result of printing a document or the like to be displayed on a screen. In a case where the result of printing extends over a plurality of pages, preview images in which all of pages are laid out are created but only those preview images that can fit within the display window of the screen are displayed. The user can view all pages by scrolling the screen.

Print preview in an information processing apparatus in which a conventional print driver has been installed presents a preview of one page to be printed or a preview in which all pages to be printed are laid out horizontally and vertically. In case of a preview display in which all pages to be printed are laid out, the number of pages that can be displayed simultaneously is small if the preview display is to be presented at a size large enough to allow the content of the pages to checked. If the display unit is one regularly available, the number of pages is limited to one page at most. It the dimensions of pages displayed are reduced, a plurality of pages can be previewed simultaneously but then it will be difficult or entirely impossible to check the content of the pages.

Thus, in a case where there are a plurality of sheets (pages) to be printed, it is not possible to provide a print preview display that enables the user to readily recognize the fact that the printing of a plurality of sheets will continue while also allowing the user to visually recognize the content to be printed by observing the print preview display.

SUMMARY OF THE INVENTION

Accordingly, a first object of the present invention is to provide an information processing apparatus and preview display method for causing a plurality of preview images to be superimposed and displayed while the preview images, which are to be printed on paper, are offset or shifted horizontally and vertically, thereby making it possible for a user to visually recognize, in simple fashion, the content to be printed and the fact that a plurality of sheets are to be printed.

A second object of the present invention is to provide an information processing apparatus and preview display method in which when a plurality of preview images are superimposed and displayed while the preview images, which are to be printed on paper, are offset or shifted horizontally and vertically, it is made possible for the user to specify the amount of offset, thereby enabling expression of a print preview desired by the user.

A third object of the present invention is to provide an information processing apparatus and preview display method in which when a plurality of preview images are superimposed and displayed while the preview images, which are to be printed on paper, are offset or shifted horizontally and vertically, the amount of offset is changed appropriately in case of a print setting for which the image area to be printed on paper will differ, as in the manner of a setting to print with or without borders, thereby making it possible for the user to visually recognize the print preview in simple fashion.

According to a first aspect of the present invention, the foregoing objects are attained by providing an information processing apparatus for implementing a print preview display of print data that is to be printed, the apparatus comprising an acquisition unit for acquiring amount of offset of a page in a print preview; a preview display control unit for causing the preview image display, which is generated by the preview image generating unit, to be offset and displayed for every sheet of paper in a case where the print data is to be printed on a plurality of sheets of paper, based upon amount of offset acquired by the acquisition unit.

According to a second aspect of the present invention, the apparatus further comprises an offset-amount input unit for inputting amount of offset of the print preview based upon a designation from a user. The acquisition unit acquires the amount of offset that has been input from the input unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

A printing system according to a first embodiment of the invention will now be described with reference to the drawings.

Figure 1:
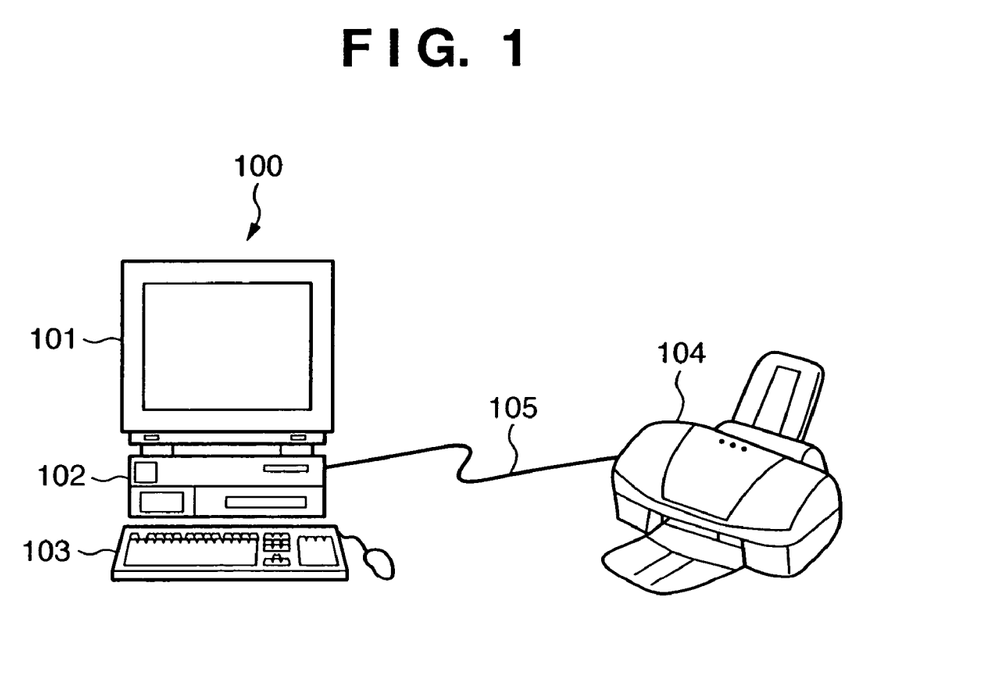
FIG. 1 is a diagram illustrating an example of a printing system according to an embodiment of the present invention.

FIG. 1 is a diagram illustrating an example of a printing system according to an embodiment of the present invention. An information processing apparatus 100 in which a printer driver has been installed and an ink-jet printer (referred to simply as a "printer" below) 104 are connected by, e.g., a USB interface 105. The information processing apparatus 100 includes a monitor 101, a main unit 102 and an input device 103.

Figure 2:
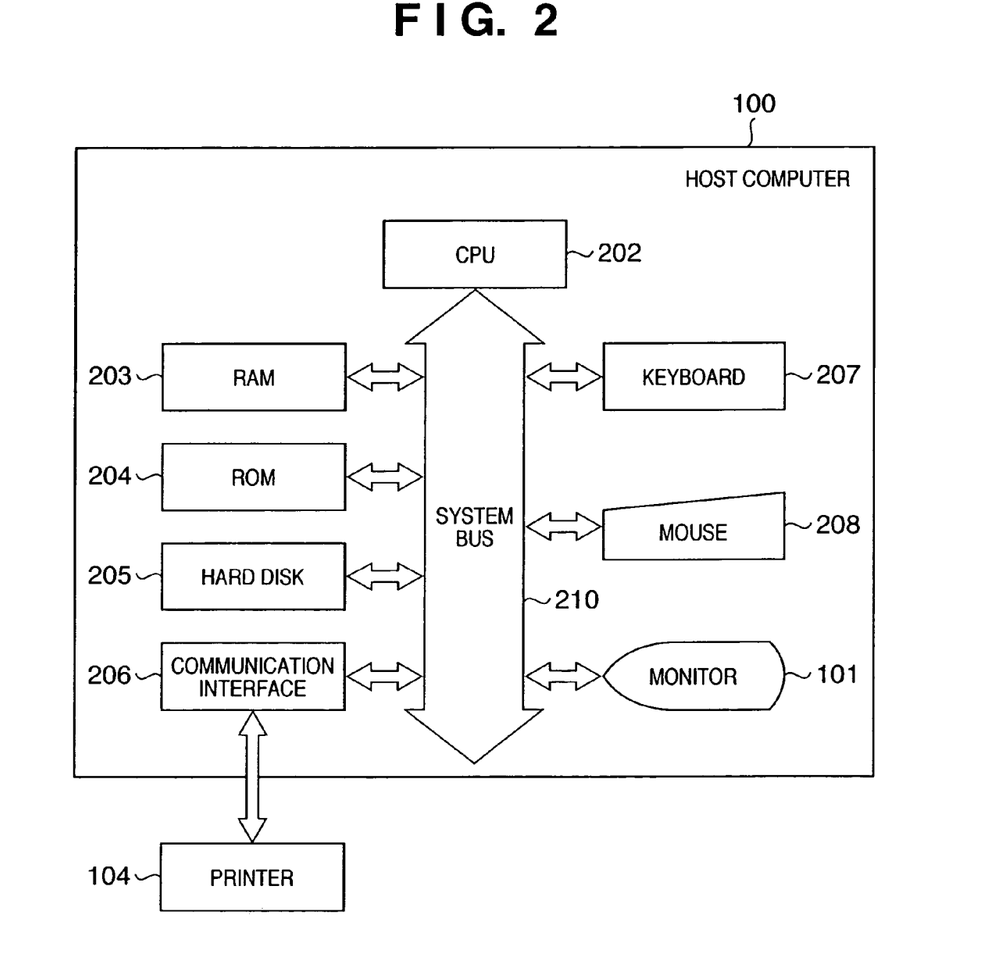
FIG. 2 is a block diagram useful in describing the structure of an information processing apparatus in the printing system of this embodiment.

FIG. 2 is a block diagram illustrating an example of the basic hardware implementation of the information processing apparatus (a host computer, referred to as a "personal computer" below) 100. As shown in FIG. 2, the personal computer 100 includes, in the main unit 102, a central processing unit (referred to as a "CPU" below) 202 for executing data processing and device control by performing operations and making decisions in accordance with instructions; a RAM 203 and ROM 204 for storing an operating system, a printer driver and a control program; a storage device such as a hard disk 205; a communication interface 206, such as a USB, SCSI or wireless means, for performing data communication with the printer 104; and a system bus 210 for connecting these devices. Also connected are the input device 103, which comprises a keyboard 207 and mouse 208 serving as user interface means, and the monitor 101, which comprises a CRT or liquid crystal display. The input device 103 and monitor 101 are connected via an input interface and graphic controller, respectively.

Figure 3:
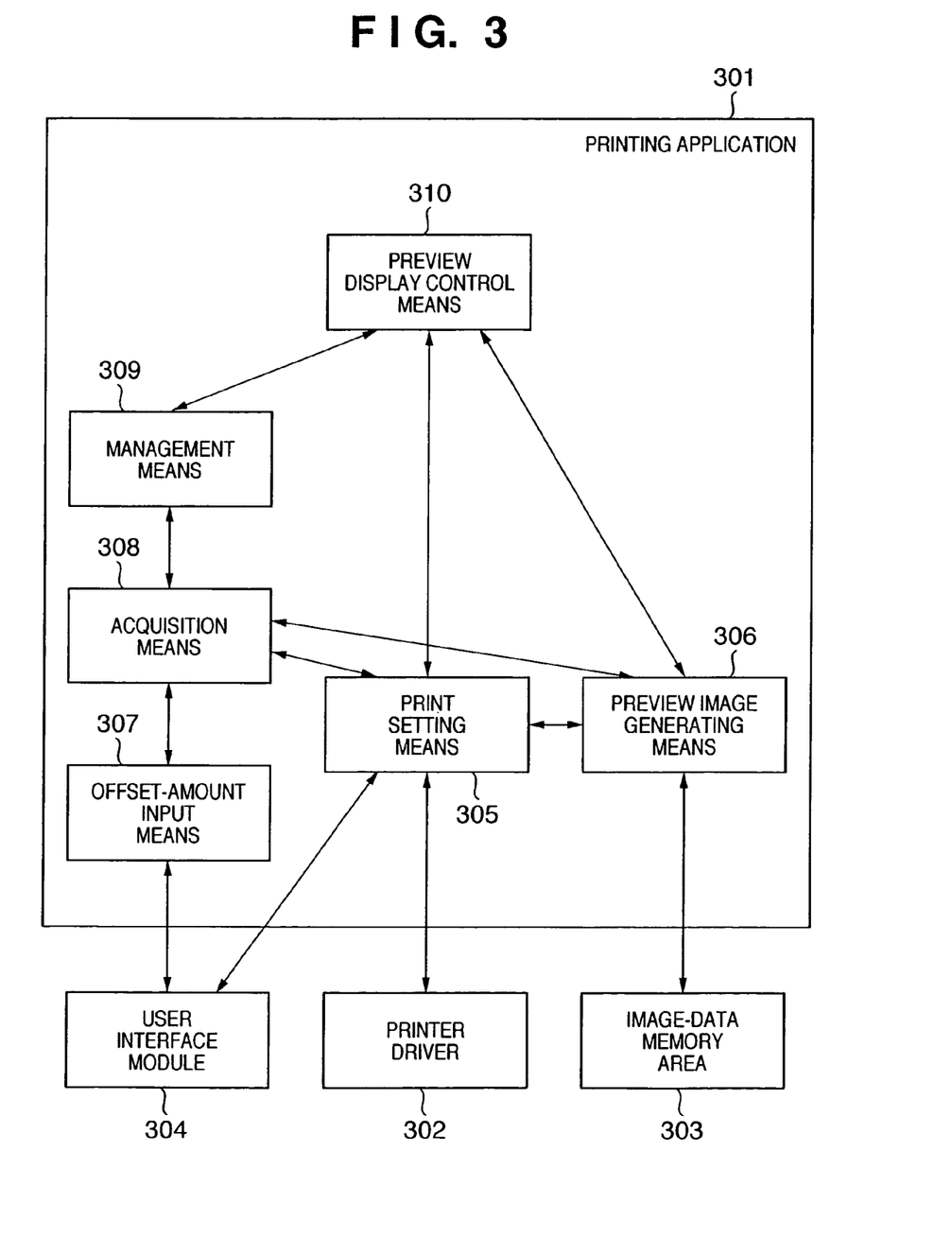
FIG. 3 is a block diagram illustrating the functional structure of a printing module in the information processing apparatus shown in FIG. 2.

FIG. 3 is a block diagram illustrating the functional structure of a printing module implemented in the information processing apparatus 100 shown in FIG. 2. The components shown in FIG. 3, particularly a printing application 301, user interface module 304 and printer driver 302, etc., are implemented by executing a prescribed program, which has been stored in the RAM 203 or ROM 204, by the CPU 202. An image-data memory area 303 in which print data that is to be printed by the printer is stored is reserved in the RAM 203 or hard disk 205.

In FIG. 3, the printing application 301 constitutes a characterizing feature of the present invention and functions as a module for implementing print preview processing. In FIG. 3 illustrating this embodiment, the printing application 301 is an application that is independent of the printer driver. For example, the printing application 301 corresponds to bundled software (printing utility software, etc.) that comes together with purchase of the printer 104. However, processing of print preview according to the present invention is not limited to an independent application. It may exist as a module whose read-out is specified from the printer driver 302, namely one module in the entire printer driver, in a case where preview display of print data is presented. The user interface module 304 is a module for generating a user interface displayed on the monitor 101 and has a function for generating the elements of print setting screens shown in FIGS. 4, 5, 8 and of a print preview display screen shown in FIG. 10, described later. On the basis of print settings made by the user via the user interface screen generated by the user interface module 304, the printing application 301 causes a print preview of image data in the image-data memory area 303 to be displayed on the monitor 101 via the operating system and display driver. The printing application 301 usually is recorded on the hard disk 205 and is executed by the CPU 202 upon being loaded into the RAM 203. In this embodiment, an image data file (referred to as "print-target image data" below) is used as the print data to be printed by the printing apparatus. However, the print data is not limited to image data and may be a document data file created by a general-purpose application. In order to simplify the description, it will be assumed that an image data file is what is to be printed. The image data file will be referred to as "print-target image data" below.

The printer driver 302 has print setting items that can be set with regard to the printer 104. The main items include paper size, layout and number of copies, etc. Once the value of an item has been set, the value is stored on the hard disk 205 or the like and is utilized whenever printing is performed. Of course, the setting can be changed on a print setting screen displayed by the user interface module 304. The printer driver 302 also is a program executed by the CPU 202 and is prepared in accordance with the printer 104 in order to make possible optimum setting and control in conformity with the functions of the printer 104.

The image-data memory area 303 is constructed on the hard disk 205 or in an external memory device (e.g., a memory card) (not shown) that is connected via the communication interface 206. The image-data memory area 303 stores digital still images (referred to simply as "images" below) that have been captured as by a digital camera.

It should be noted that the printing application 301 and printer driver 302 are shown as being in direct communication in FIG. 3. Depending upon the operating system, however, the application and printer driver are also capable of communicating only via the operating system. The present invention is of course applicable also in regard to a printing application executed under such an operating system (e.g., the Windows operating system Microsoft, Inc.). However, since the existence of the operating system is not particularly important, the operating system is not described in the present invention.

The modules that construct the printing application 301 will be described next. The blocks referred to as "means" in the printing application 301 all exist as software modules and are implemented by processing in the CPU 202. More specifically, the term "means" within the application 301 shown in FIG. 3 can be replaced with "program module".

The printing application 301 has print setting means 305 for acquiring print setting items possessed by the printer driver 302 and for causing a print setting screen to be displayed on the monitor 101 via the user interface module 304. If a setting value corresponding to a print setting item acquired in accordance with an operating command from the user is input via the user interface module 304, then the entered setting value is stored on the hard disk 205 in association with the print setting item.

Preview image generating means 306 acquires print-target image data from the image-data memory area 303 in accordance with the print settings stored by the print setting means 305. The preview image generating means 306 then converts the acquired print-target image data to RGB full-color multivalued bitmap data and, based upon the print-settings information, adjusts the bitmap size to generate a preview image for each sheet of paper. For example, if N-page printing in which N-number of pages are printed on a single sheet of paper has been set, then N pages of print-target image data are acquired and converted to bitmap data, after which the data is scaled to the size of one sheet.

Figure 5:
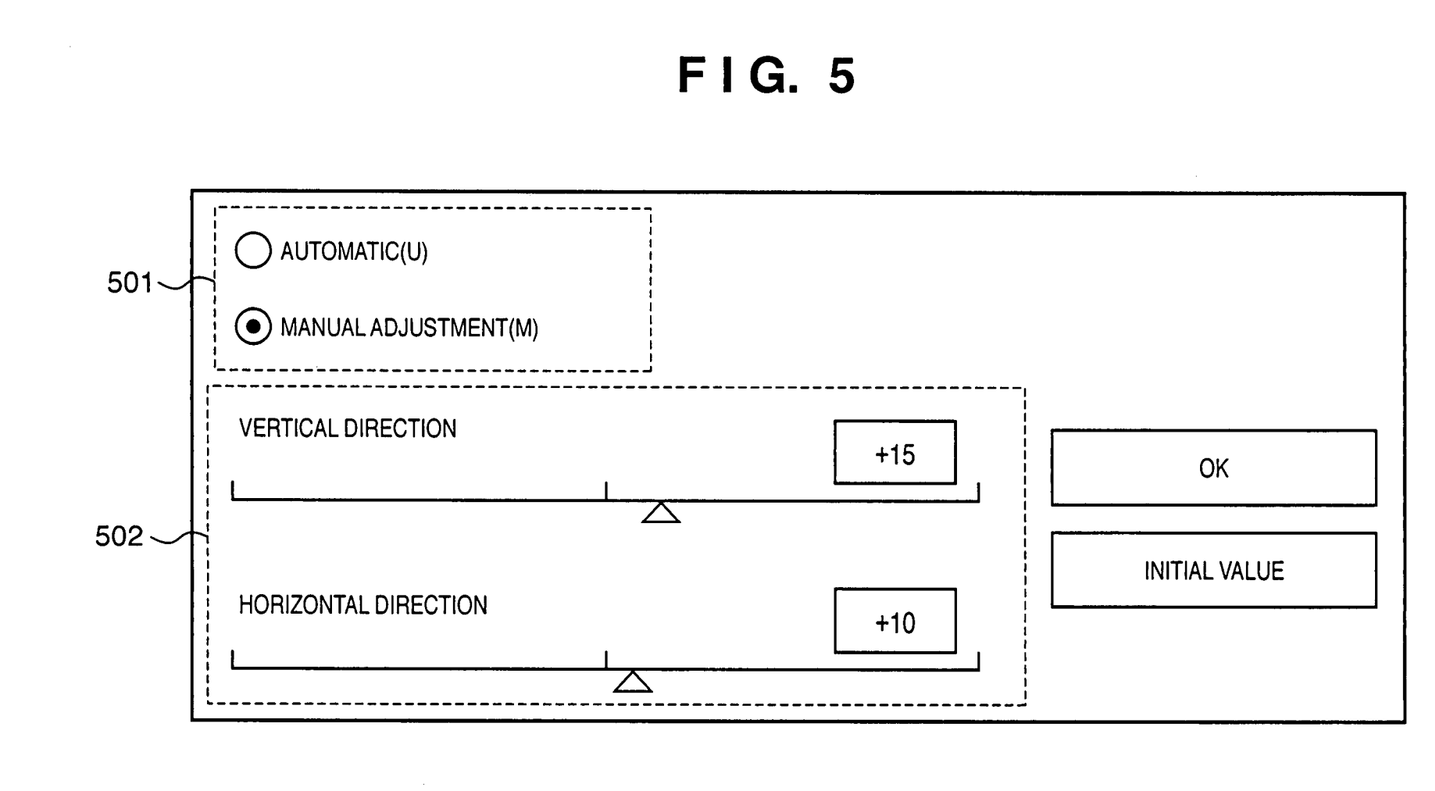
FIG. 5 is a diagram of a display screen illustrating an example of a user interface for specifying amount of offset of superimposed print previews in the printing application shown in FIG. 3.

Offset-amount input means 307 acquires amount of paper offset of a print preview vertically and horizontally in accordance with the command entered by the user on the display screen of FIG. 5 displayed by the user interface module 304. Amount of paper offset will be described later with reference to FIG. 5.

Acquisition means 308 acquires the offset amount that has been entered from the offset-amount input means 307 and stores the amount on the hard disk 205 using management means 309. Further, on the basis of print settings stored by the print setting means 305 and the image size of the image data acquired by the preview image generating means 306, the acquisition means 308 calculates the margins of the paper, decides the amount of offset and stores the amount of offset in the management means 309.

The management means 309 stores and manages the offset amount acquired by the acquisition means 308. Amount of offset stored and managed by the management means 309 is not limited to a single set, and there are cases where a plurality of sets of offset amounts are stored.

On the basis of the print settings stored by the user interface module 304, preview display control means 310 causes the preview image generated by the preview image generating means 306 to be displayed as a preview image on the interface unit 101 via the operating system. In a case where the print preview displayed extends over a plurality of sheets of paper, the preview display control means 310 selects the appropriate offset amount from the offset amounts stored by the management means 309, generates an image, in which print previews for each of the sheets of paper are superimposed, while offsetting the display position vertically and horizontally by the offset amount selected, and causes this image to be displayed on the monitor 101 via the operating system. A method of selecting the appropriate offset amount will be displayed later with reference to FIG. 7, etc.

The structure of a preferred embodiment of the invention and the modules indicative of operation of this embodiment will now be described.

Figure 4:
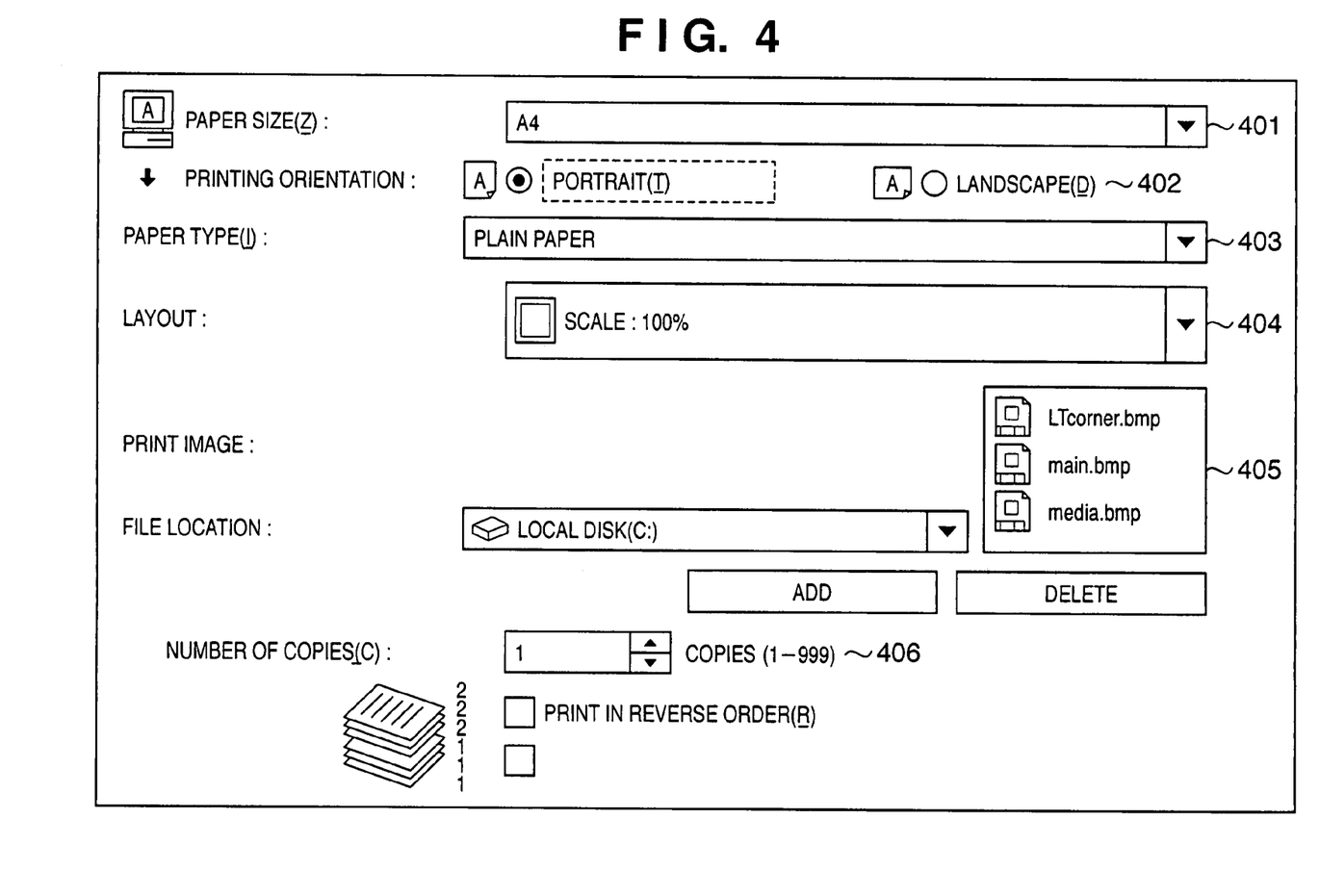
FIG. 4 is a diagram of a display screen illustrating an example of a user interface for making print settings in a printing application shown in FIG. 3.

FIG. 4 is a diagram illustrating an example of a display screen illustrating an example of a user interface screen (print setting screen) generated by the user interface module 304 for making print settings in the printing application 301. The screen of FIG. 4 is displayed by an operation such as a command input or menu selection in a case where the printing application 301 is being executed. In a case where the printing application of this invention operates as one module of a printer driver, as mentioned above, it is displayed as the print setting screen of the printer driver called via the operating system when printing of a document is performed from within a general-purpose application.

In a paper size setting item 401 among the print settings, the size of the paper used in printing, such as A4, postcard, L format and 2L format, is specified. The feed direction of the paper at the time of printing is specified in a printing-direction setting item 402. The type of paper used in printing, such as plain paper, glossy paper or matte paper, is specified in a paper-type setting item 403. Image layout on one sheet of paper, such as one page, two pages or four pages per page or index printing, is specified in a layout setting item 404.

Image data to be printed is specified in a print-image setting item 405. With regard to image data to be printed, the computer running this printing application or a computer connected by a network can be specified as the file location and a desired file (one limited to a printable format) is selected as the image data from among files being managed at this location. It should be noted that data to be printed by the printing application need not be limited to image data; data can be selected as data to be printed so long as it is in a format that can be printed by the printing application.

Total number of copies is specified in a copy-number setting item 406. Print settings performed using the user interface of FIG. 4 are stored by the print setting means 305 illustrated in FIG. 3.

The number of paper sheets printed is uniquely decided by the print data and the print setting values, particularly the setting values in the paper size setting item 401, layout setting item 404, print-image setting item 405 and copy-number setting item 406. Further, image pasting position (margin size) of each sheet of paper printed is uniquely decided by the setting values in the paper size setting item 401, layout setting item 404 and print-image setting item 405. Since the printing application 301 of this invention is positioned as bundled software at the time the printer is purchased, it is assumed that the acquisition and setting of print settings can be performed via an API (Application Program Interface) that is independent of the printer driver, where the API is an arrangement for calling a function provided by a DLL (Dynamically Linked Library) file.

FIG. 5 is a diagram of a display screen illustrating an example of the user interface 304 for specifying amount of offset of a superimposed print preview in the printing application 301. The screen shown in FIG. 5 also is displayed by an operation such as a command input or menu selection in a case where the printing application 301 is being executed.

An offset-amount setting mode is specified in an offset-amount setting selection item 501. More specifically, here the user specifies whether to display a print preview using an offset amount decided based upon a print setting stored by the print setting means 305 (this is an automatic mode, which is specified if "AUTOMATIC" has been selected), or to display a print preview using an offset amount specified by the user (this is a manual mode, which is specified if "MANUAL ADJUSTMENT" has been selected). What the user specifies is stored by the management means 309 in memory or on the hard disk 205 together with the offset amount.

An offset-amount setting item 502 is an item that is activated in a case where manual adjustment has been selected in the offset-amount setting selection item 501. This item allows the user to specify offset amounts in both the vertical and horizontal directions. The offset amount is expressed by a slide bar, where the center position indicates an offset amount of zero. A negative offset amount indicates an upward or leftward shift and a positive offset amount indicates a downward or rightward shift. Initially set values of offset amount may use offset amounts, which are already being held by the printer driver 302, acquired by the print setting means 305.

An offset amount specified using the user interface of FIG. 5 is stored by the management means 309 indicated in FIG. 3.

<Preview Processing Procedure>

Described next will be the details of the procedure of preview processing executed by the information processing apparatus in the printing system of the above-described embodiment.

Figure 6:
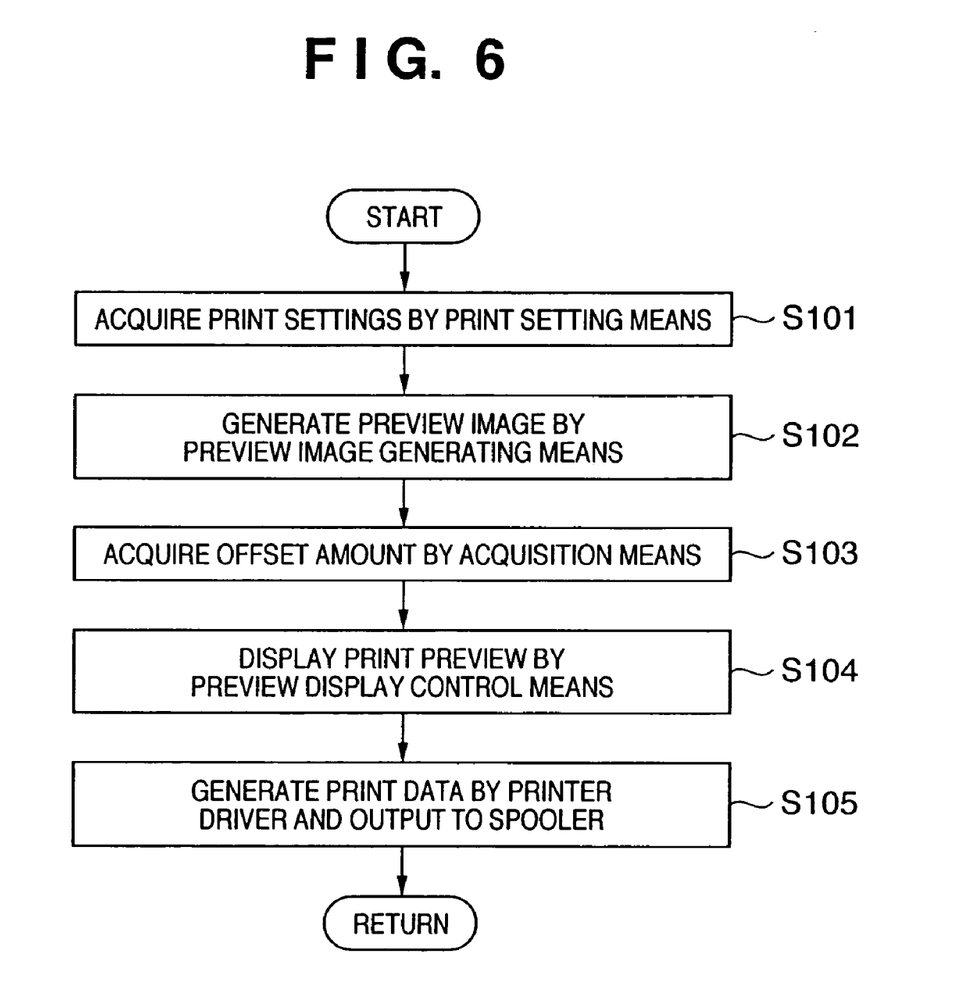
FIG. 6 is a flowchart of overall processing that includes print preview and print data generation processing in the information processing apparatus of the present invention.

FIG. 6 is a flowchart of overall processing that includes print preview and print data generation processing in the information processing apparatus of the present invention. In FIG. 6, S101 to S105 indicate step numbers.

When the printing application 301 is launched, the print setting means 305 acquires the values of the print settings (also referred to as "print settings information"), which are entered by the user via the user interface screen shown in FIG. 4, at step S101.

Next, at step S102, the preview image generating means 306 acquires the print-target image data, which is set in the print-image setting item 405 by referring to the print settings acquired at step S101, from the image-data memory area 303 and generates a preview image that has been edited in accordance with the layout information. It should be noted that processing for generating a preview image uses a well-known technique and therefore is not described here in detail.

Next, at step S103, the acquisition means 308 acquires from the offset-amount input means 307 the offset setting information, which includes the setting mode (automatic or manual) entered by the user via the user interface screen of FIG. 5, and the offset amount and stores the acquired setting mode and offset amount in the management means 309.

Next, at step S104, the preview display control means 310 causes the preview image generated at step S102 to be displayed as a print preview for every sheet of paper by referring to the offset setting information (the setting mode and the offset amount) acquired by the acquisition means at step S103. Here it is determined whether the images to be printed extend over a plurality of sheets of paper. If this is found to be the case, the appropriate offset amount is acquired from the setting mode and offset amount stored by the management means, display images for a superimposed print preview are generated while offsetting the print preview of each sheet of paper vertically and horizontally, and the display images for the superimposed print preview are displayed on the monitor 101 via the operating system and display driver. If "AUTOMATIC" has been selected in regard to the setting mode shown in FIG. 5, then the appropriate offset amount will be an offset amount that allows a part of the content to be displayed even in regard to a page covered by another page owing to the overlapping display of pages. If "MANUAL" has been selected in regard to the setting mode shown in FIG. 5, then the offset amount that was entered previously is acquired as the appropriate offset amount.

If execution of printing is specified after the print preview images are displayed on the monitor, the printing application 301 acquires the print-target image data being held by the image-data memory area 303 and executes processing to print the print-target image data acquired. More specifically, the printing application 301 causes the print setting information that has been set in the print setting means 305 to be set in the printer driver via the API and executes printing of the print-target image data. That is, the printing application 301 outputs a rendering function corresponding to the print-target image data to rendering means (a Graphical Device Interface, or GDI) of the operating system, and the rendering means of the operating system converts the rendering function that enters from the application to a rendering function supported by the printer driver and causes the printer driver to execute rendering processing.

The preview image generating means 306 transmits the print-target image data to the printer driver 302 via the rendering means of the operating system at step S105. In case of color image data, the printer driver 302, on the basis of the rendering function received, converts RGB full-color multi-valued bitmap data to yellow (Y), magenta (M), cyan (C) and black (K) binary raster-format bitmap data by scaling processing, halftone processing, complementary-color conversion and binarization processing, and generates print data from the bitmap data using a printer command that can be interpreted by the printer 104. The printer driver 302 outputs the generated printer command to a spooler. Control then returns to step S101. Further, the print data that has been output to the spooler is transmitted to the printer 104 via the communication interface 206 and is printed by the printer 104.

Figure 7:
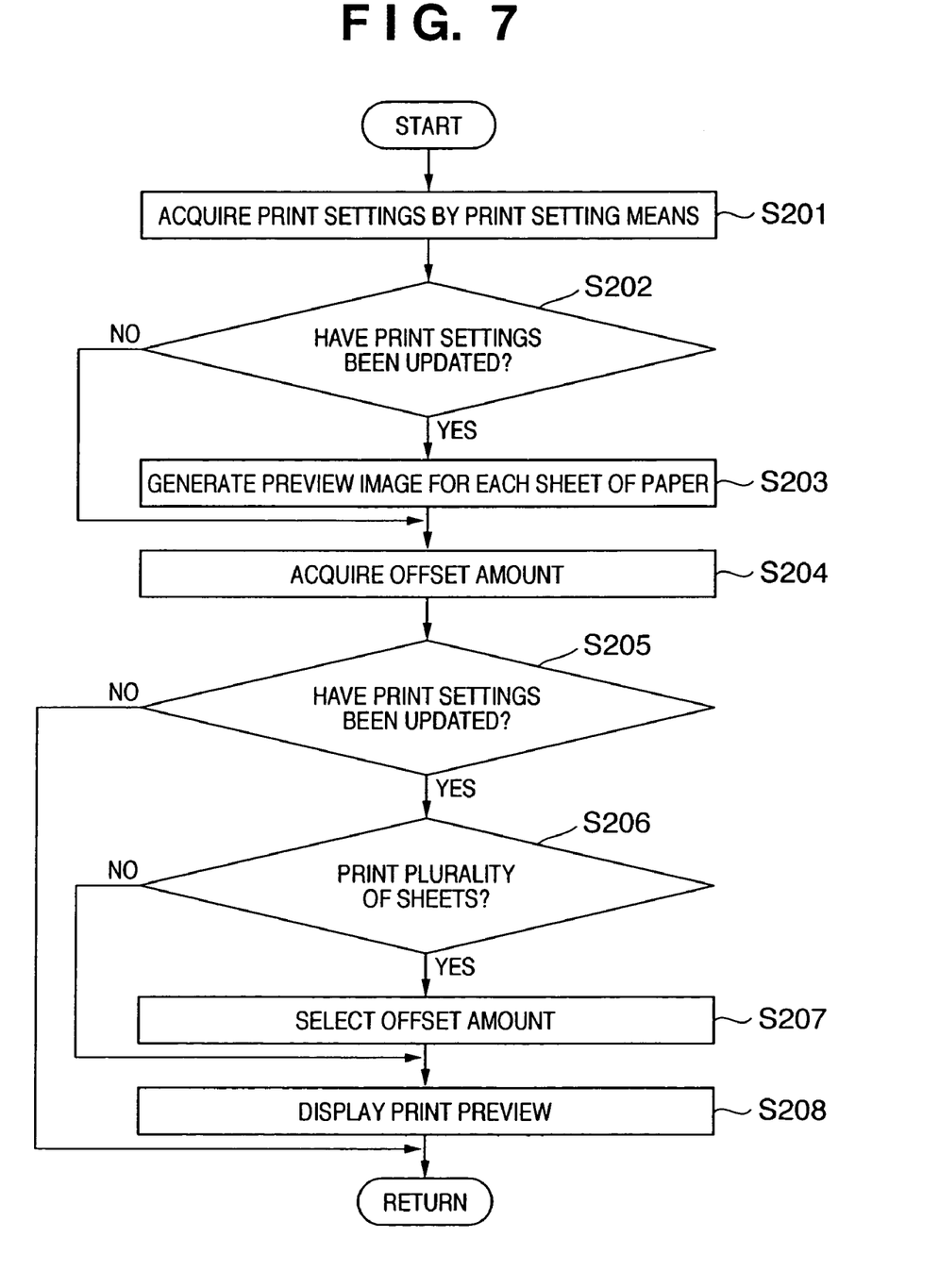
FIG. 7 is a flowchart of print preview display processing according to a first embodiment of the information processing apparatus of the present invention; 1

Next, reference will be had to FIG. 7 to describe the details of processing up to the print preview display (step S104 in FIG. 6) in the overall processing shown in FIG. 6. FIG. 7 is a flowchart of print preview display processing in the information processing apparatus of the present invention and represents a first embodiment up to the print preview display. Here S201 to S208 indicate processing steps.

When the printing application 301 is launched, the print setting means 305 acquires the print settings via the user interface screen shown in FIG. 4.

Next, at step S202, the preview image generating means 306 refers to the print settings acquired at step S201 and determines based upon the print settings acquired previously whether this information has been changed. If the information has been changed ("YES" at step S202) (the first decision rendered immediately after launch is "YES"), then the preview image generating means 306 executes the processing of step S203.

At step S203, the preview image generating means 306 refers to the print settings acquired at step S201, particularly the paper size, layout and print-target image number, acquires the print-target image data from the image-data memory area 303 and generates preview images from the image data acquired. It should be noted that the preview images generated are stored in the image-data memory area 303 until update processing is executed.

If it is determined that the print settings have not been changed ("NO" at step S202), then the processing of step S203 is not executed.

Next, at step S204, the acquisition means 308 acquires the offset setting information (the offset amount and setting mode) from the offset-amount input means 307 via the user interface screen shown in FIG. 5. The offset amount and setting mode acquired are added onto the existing setting value of offset amount and stored by the management means 309. If it is found at step S204 that the "MANUAL ADJUSTMENT" mode has been selected, then the entered offset amount is stored as a setting value for manual adjustment in such a manner that it can be recognized from other setting values in a case where other setting values of offset amount have been stored.

Next, at step S205, the preview display control means 310 determines whether the print settings and offset amount acquired at steps S201 and S204 have changed from the information applied previously. If there has been a change ("YES" at step S205) (the first decision rendered immediately after launch is "YES"), then the processing from step S206 onward is executed. At step S205, it may be determined whether an input was made at step S204 with regard to offset amount, i.e., whether an "OK" button on the user interface screen of FIG. 5 displayed at step S204 has been pressed. If such an input has been made (if the "OK" button has been pressed), then control may branch to step S206 on the grounds that information has been updated.

At step S206, the preview display control means 310 refers to the print settings acquired at step S201 and determines whether a setting for printing on a plurality of sheets of paper has been made. If the number of pages to be printed is plural ("YES" at step S206), then control proceeds to step S207. If the number of pages is not plural ("NO" at step S206), then the processing of step S207 is not executed.

The setting mode and offset amount are selected from the management means 309 at step S207. The selection of offset amount differs depending upon whether the setting is automatic or manual. Accordingly, first, at step S207, it is determined whether the setting mode is "AUTOMATIC" or "MANUAL ADJUSTMENT". This determination is made upon referring to the value of the setting mode entered at step S204 or an already stored value of setting mode.

If the setting mode is the "AUTOMATIC" mode, then reference is had to the print settings to acquire the setting values of margins at the top, bottom, right and left sides of the pages. Margin settings are made and stored by the printing application separate for each of the top, bottom, right and left sides of pages. The stored offset amount and margin width are compared by the management means and the smallest offset amount is selected from among offset amounts that are larger than the margin, by way of example. Offset amount has been set for each of the vertical and horizontal directions and margins also have been set for each of the top, bottom, right and left sides. Accordingly, the top margin of the page is compared with the offset amount that has been set in the upward direction, the bottom margin of the page is compared with the offset amount that has been set in the downward direction, the right margin of the page is compared with the offset amount that has been set in the rightward direction, and the left margin of the page is compared with the offset amount that has been set in the leftward direction. Setting values of offset amounts that satisfy the above requirement with regard to the vertical and horizontal directions are decided upon as the offset amounts used in the preview. It should be noted that although the offset amounts are decided independently for the vertical and horizontal directions, the offset amounts may be decided by adopting offset amounts in the vertical and horizontal directions, which offset amounts have been set on the user interface screen of FIG. 5, as one set. In such case it will be necessary for horizontal offset amounts and vertical offset amounts of one set to both be larger than the set margin widths. Further, it has been stated that the smallest offset amount is selected from among offset amounts that are greater than the margin. However, in order to display content more positively, the smallest offset amount may be selected from among offset amounts greater than a value obtained by adding a fixed value to the value of a margin.

If the setting mode is found to be the "MANUAL ADJUSTMENT" mode, on the other hand, then a setting value for manual adjustment stored at step S204 is read out and this value is selected as the offset amount used in the preview.

Next, at step S208, the preview display control means 310 refers to the information acquired at step S201 and the offset amount selected at step S207 and causes the preview image created at step S203 to be displayed as a print preview for each sheet of paper. A method of laying out the print previews of each of the sheets of paper is to so arrange it that the first page (or the final page if desired) is previewed as the frontmost page and then arrange the previews successively so as to obtain a display in which the pages overlap while offsetting the preview of each succeeding page vertically and horizontally in accordance with the offset amount. That is, a preview image of each page is created in the image-data memory area 303 first with regard to the final page, then the preview image of the next page is superimposed on the above-mentioned page by offsetting it by the offset amount selected. By repeating this up to the top page, preview images are created and displayed with regard to one set of printed matter. Or, conversely, the preview image of the top page is created first, preview images are created in order up to the final page and the images are displayed while superimposing them on the preceding page.

Figure 10:
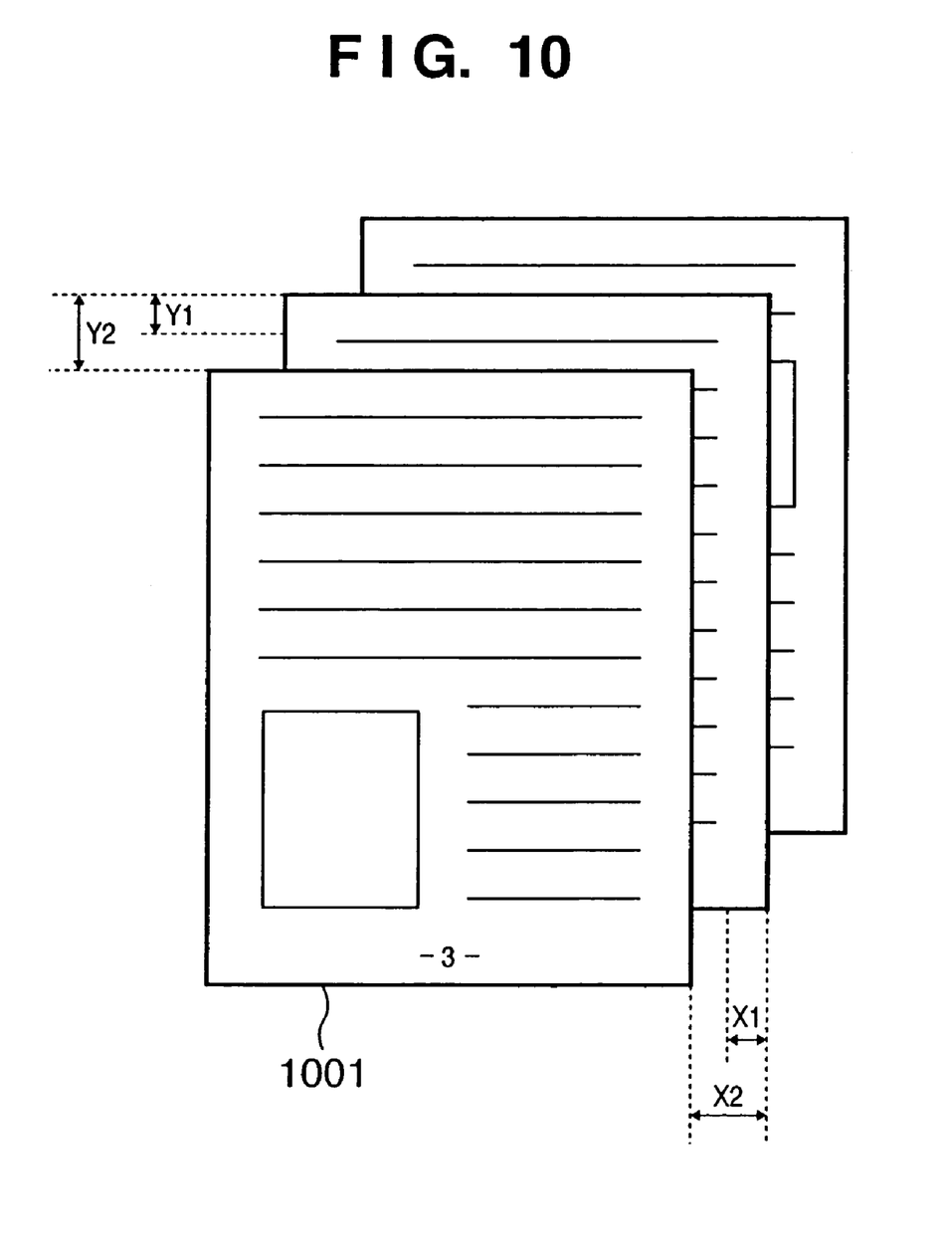
FIG. 10 is a diagram illustrating an example of a preview display according to the present invention.

FIG. 10 is a diagram illustrating an example of preview images generated by the user interface module 304 and displayed on the monitor 101 via the operating system. A page 1001 is the final page in the example of FIG. 10. A margin X1 has been provided on the right side and a margin Y1 on the top side. Accordingly, offset amounts X2, Y2 greater than the margins X1, Y1, respectively, have been selected in the respective directions.

Further, if it is determined at step S205 that the print settings and offset amount have been changed ("NO" at step S205), then the processing (steps S206 to S208) for updating display of the print preview is not executed.

In a case where the number of pages output extends over a plurality of pages, preview images in which the plurality of pages are superimposed can be created and displayed through the procedure described above. As a result, preview images can be displayed in a size large enough to allow the operator to recognize content and in a format that makes it possible for the operator to understand that the output will extend over a plurality of pages.

Second Embodiment

A second embodiment up to display of a print preview will be described next. This embodiment provides a printing system that executes almost the same procedure as that of the first embodiment by a structure almost the same as that of the first embodiment. This embodiment differs from the first embodiment in that (1) the procedure of FIG. 9 is executed instead of the procedure of FIG. 7, (2) setting of borderless full-page printing is possible instead of or in addition to setting of margins, and (3) there is no setting for manual adjustment of offset amount.

Figure 8:
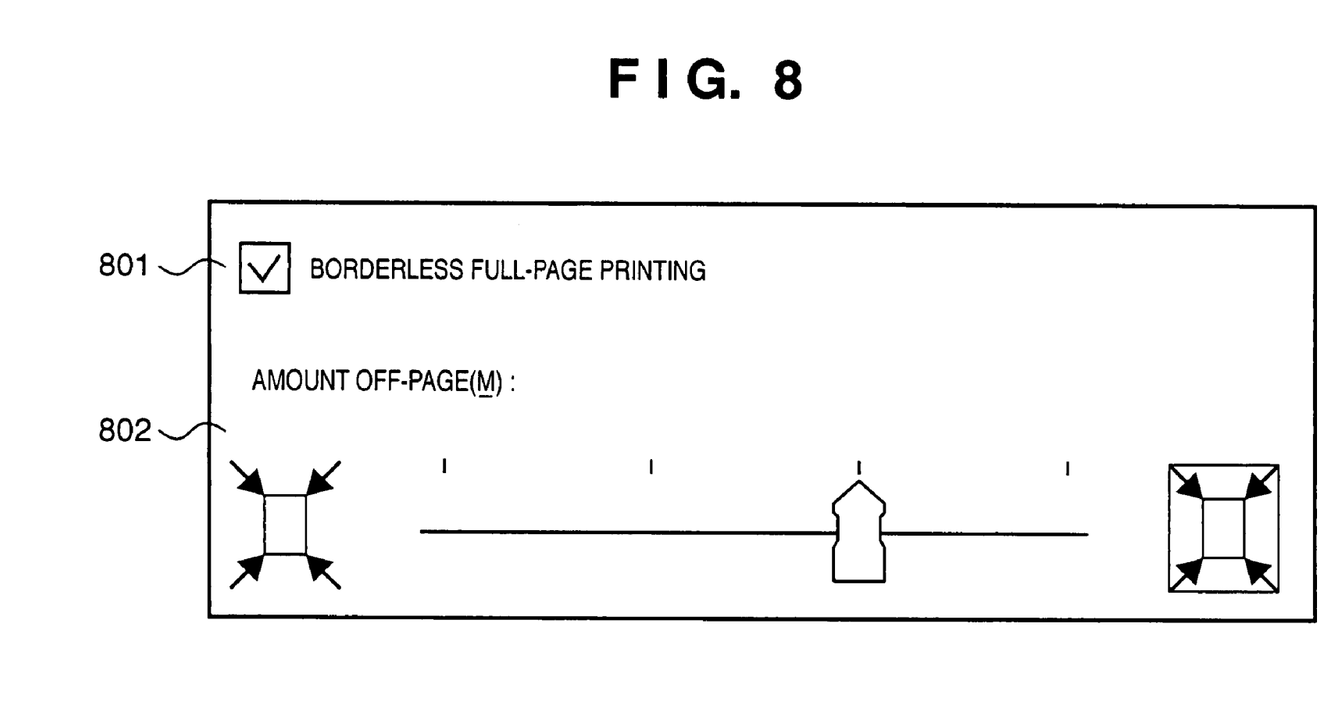
FIG. 8 is a diagram of a display screen illustrating an example of a user interface for making print settings (setting of a layout for borderless printing) in the printing application shown in FIG. 3.

FIG. 8 is a diagram of a display screen illustrating an example of a user interface for making print settings using the printing application 301. In particular, this screen is for setting a borderless printing layout. By providing an area such as a "BORDERLESS SETTING" area on the user interface screen of FIG. 4, the setting screen of FIG. 8 may be set in this area. Setting of borderless printing may also be made from a separate menu area (not shown). In any case, the user interface of FIG. 8 is displayed if setting of borderless printing is selected.

The user specifies borderless full-page printing by checking a borderless-print designation item 801. If borderless full-page printing has been specified, the user employs an off-page amount setting item 802 to set the amount of the image that will lie off-page at the time of printing. The off-page amount is the amount of the image that will lie off the sheet of printing paper. The farther the slider is moved rightward in FIG. 8, the greater the off-page amount; the farther the slider is moved leftward, the smaller the off-page amount. For example, if the slider is at the extreme left end, the size of one page of bitmap image data and the size of the paper sheet will coincide. The information that has been set using the user interface of FIG. 8 is stored by the print setting means 305.

Figure 9:
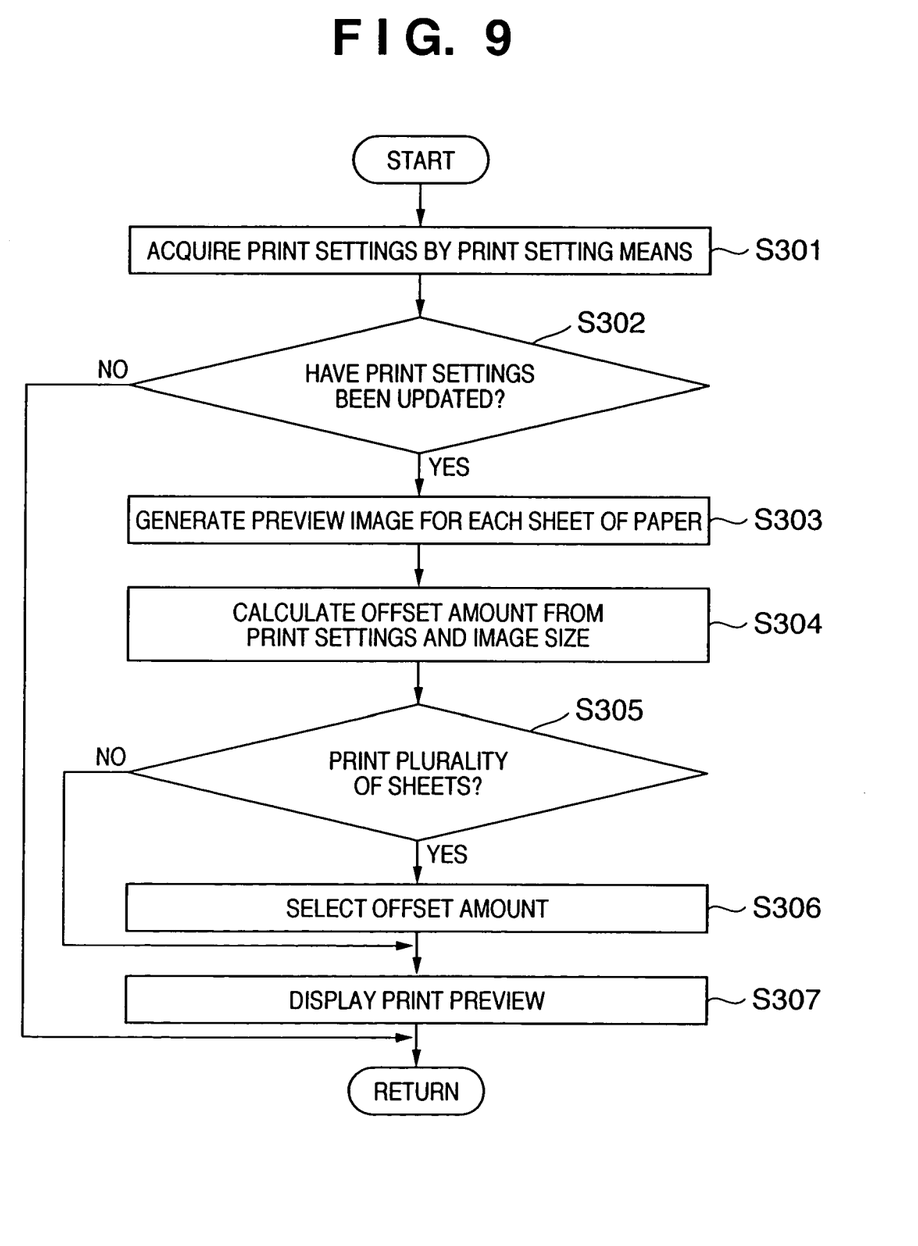
FIG. 9 is a flowchart of print preview display processing according to a second embodiment of the information processing apparatus of the present invention.

FIG. 9 is a flowchart of print preview display processing in the information processing apparatus according to the second embodiment of the present invention. Here S301 to S307 indicate processing steps.

When the printing application 301 is launched, the print setting means 305 acquires the print settings at step S301 via the user interface screen shown in FIG. 4. This print layout also includes the borderless-print layout information that is set using the user interface shown in FIG. 8.

Next, at step S302, the preview image generating means 306 refers to the print settings acquired at step S301 and determines based upon the print settings acquired previously whether this information has been changed. If the information has been changed ("YES" at step S302) (the first decision rendered immediately after launch is "YES"), then the preview image generating means 306 refers to the print settings, particularly the paper size, layout and print-target image number, acquires the print-target image data from the image-data memory area 303 and generates preview images from the image data acquired. The preview images generated are stored until update processing is executed.

Next, the acquisition means 308 refers to the print settings acquired at step S301 and calculates the offset amount at step S304. At this time, on the basis of the print settings stored by the print setting means 305 and the image size of the image data acquired by the preview image generating means 306, the acquisition means 308 calculates the margin size of the paper, decides an offset amount that will allow the image to be visually confirmed and stores this in the management means 309. For example, a value obtained by adding a character-size length of, e.g., ten points to the margin width is decided upon and stored as the offset amount. As a result, even if a page is covered from above by another page, characters or images inwardly of the margin can be displayed. It goes without saying that the value added to the margin width is not limited to ten points. If the size of a character can be acquired from the print information, then this character size may be added on. It is also permissible to add on a suitable constant.

On the other hand, if the "BORDERLESS FULL-PAGE PRINTING" layout has been specified by the print settings acquired at step S301, then there will be no paper margins. At step S304, therefore, a small offset amount is used. The value per se added to the margin (e.g., the value equivalent to the number of points of the character, or the constant) may be used as this small offset amount.

At step S305, the preview display control means 310 refers to the print settings acquired at step S301 and determines whether a setting for printing on a plurality of sheets of paper has been made. If the number of pages to be printed is plural ("YES" at step S305), then the preview display control means 310 selects the offset amount from the management means 309 at step S306. If the print information acquired at step S301 has been set to the borderless printing layout, then an offset amount smaller than that in the case where borderless printing is not set is selected from the management means 309.

If the number of pages is not plural ("NO" at step S305), then the processing of step S306 is not executed.

At step S307, the preview display control means 310 refers to the information acquired at steps S301 and S306 and causes the preview image created at step S303 to be displayed as a print preview for each sheet of paper. A method of laying out the print previews of each of the sheets of paper is to so arrange it that the first page (or the final page if desired) is previewed as the frontmost page and then arrange the previews successively so as to obtain a display in which the pages overlap while offsetting the preview of each succeeding page vertically and horizontally in accordance with the offset amount.

Further, if it is found at step S302 that the print settings have not been changed ("NO" at step S302), then processing is exited without execution of the processing (steps S303 to S307) for updating the display of print preview.

In a case where the number of pages output extends over a plurality of pages, preview images in which the plurality of pages are superimposed can be created and displayed through the procedure described above. As a result, preview images can be displayed in a size large enough to allow the operator to recognize content and in a format that makes it possible for the operator to understand that the output will extend over a plurality of pages. In particular, if borderless full-page printing has been set, there will be no border along the edges of the page. This means that even if the offset amount is made small to enlarge the amount of overlap, part of the content of each page can be displayed and images or documents comprising a large number of pages can be displayed in such a manner that the user can tell at a glance that the output will be a plurality of pages.

The above embodiments have been described in relation to a print preview display of images. However, this does not impose a limitation upon the present invention and the effects of the present invention are obtained for any type of printing in an application, e.g., printing of a document.

Modification 1

The printing application 301 refers in general to a program having the functions of the present invention; it does not refer to a specific application in particular. Accordingly, the application may be a specific application program that includes only the functions described in the embodiments or a program implemented as part a word processing program described in the examples of the prior art.

Further, a printing application is referred to as an application in the embodiments but is not limited to a so-called application program. The printing application can also be implemented as a submodule that constructs a library program or printer driver program shared by a plurality of programs.

Modification 2

In the first embodiment, the optimum value is selected from among a plurality of offset amounts in the "AUTOMATIC" mode and a preview display is presented while offsetting pages one at a time using this optimum value. However, as described in the second embodiment, the optimum offset amount can be decided based upon the margin width of a page and pages can be superimposed by offsetting each page by the offset amount decided. In other words, the procedure illustrated in FIG. 9 of the second embodiment can also be executed as the "AUTOMATIC ADJUSTMENT" mode of the first embodiment. If this arrangement is adopted, a storage area for storing a plurality of offset amounts will no longer be necessary, memory can be conserved and the labor entailed when the user enters a plurality of offset amounts in advance is no longer necessary, thereby making it possible to improve productivity.

Modification 3

When the preview images are displayed at steps S208 and S307, the preview images may be displayed after they are completed in the image-data memory area 303. However, it is also permissible to update the display whenever one page of a preview image is superimposed. By allowing the operator to specify, e.g., the display update intervals in such case, a preview image of the entire document output in the form of a plurality of superimposed pages can be displayed while the operator views and checks the preview image of each page.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiments, and the storage medium storing the program codes constitutes the invention.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the functions of the above embodiments.

Thus, in accordance with the present invention, as described above, a plurality of preview images are superimposed and displayed while the preview images, which are to be printed on paper, are offset horizontally and vertically, thereby making it possible for a user to visually recognize, in simple fashion, the content to be printed and the fact that a plurality of sheets are to be printed.

Further, when a plurality of preview images are superimposed and displayed while the preview images, which are to be printed on paper, are offset horizontally and vertically, it is made possible for the user to specify the amount of offset, thereby enabling expression of a print preview desired by the user.

Further, when a plurality of preview images are superimposed and displayed while the preview images, which are to be printed on paper, are offset horizontally and vertically, the amount of offset is changed appropriately in case of a print setting for which the image area to be printed on paper will differ, as in the manner of a setting to print with or without borders, thereby making it possible for the user to visually recognize the print preview in simple fashion.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for implementing a print preview display of print data that is to be printed, comprising:
    an acquisition unit for acquiring an amount of offset of a page in a print preview;
    a preview image generating unit for generating a print preview image of the print data;
    a preview display control unit for causing the preview image display, which is generated by said preview image generating unit, to be offset and displayed for every sheet of paper in a case where the print data is to be printed on a plurality of sheets of paper, based upon the amount of offset acquired by said acquisition unit;
    an offset-amount input unit for inputting the amount of offset of the print preview based upon a designation from a user;
    a management unit capable of storing a plurality of offset amounts; and
    a specifying unit for specifying whether to select an amount of offset that has been input by said offset-amount input unit or to select an amount of offset that has been stored by said management unit,
    wherein said acquisition unit acquires the amount of offset that has been specified by said specifying unit.

2. The apparatus according to claim 1, further comprising an offset-amount input unit for inputting amount of offset of the print preview based upon a designation from a user, wherein said acquisition unit acquires the amount of offset that has been input from said offset-amount input unit.

3. The apparatus according to claim 2, wherein said offset-amount input unit is capable of specifying direction and is capable of inputting independent amounts of offset in vertical and horizontal directions.

4. The apparatus according to claim 1, wherein said acquisition unit selects and acquires an amount of offset, which is larger than a size of a margin that has been set for the print preview image, from amounts of offset that have been stored by a management unit that is capable of storing a plurality of offset amounts.

5. An information processing apparatus for implementing a print preview display of print data that is to be printed, comprising:
    an acquisition unit for acquiring an amount of offset of a page in a print preview;
    a preview image generating unit for generating a print preview image of the print data;
    a preview display control unit for causing the preview image display, which is generated by said preview image generating unit, to be offset and displayed for every sheet of paper in a case where the print data is to be printed on a plurality of sheets of paper, based upon an amount of offset acquired by said acquisition unit;
    a print setting unit for setting a print layout; and
    a management unit capable of storing a plurality of offset amounts;
    wherein said preview display control unit selects an appropriate amount of offset from a plurality of offset amounts, which are stored by said management unit, based upon the print layout, and causes the print preview image to be offset and displayed page by page based upon the amount of offset selected.

6. An information processing apparatus for implementing a print preview display of print data that is to be printed, comprising:
    an acquisition unit for acquiring an amount of offset of a page in a print preview;

a preview image generating unit for generating a print preview image of the print data;

a preview display control unit for causing the preview image display, which is generated by said preview image generating unit, to be offset and displayed for every sheet of paper in a case where the print data is to be printed on a plurality of sheets of paper, based upon an amount of offset acquired by said acquisition unit; and a print setting unit for setting a borderless print setting, wherein, if borderless printing has been set, said preview display control unit selects an amount of offset that is less than that in a case where borderless printing is not set.

7. A print preview display method for presenting a print preview display of print data that is to be printed, comprising:
an acquisition step of acquiring an amount of offset of a page in a print preview;
a preview image generating step of generating a print preview image of the print data; and
a preview display control step of causing the preview image display, which is generated at said preview image generating step, to be offset and displayed for every sheet of paper in a case where the print data is to be printed on a plurality of sheets of paper, based upon amount of offset acquired at said acquisition step;
an offset-amount input step of inputting the amount of offset of the print preview based upon a designation from a user;
a management step of storing a plurality of offset amounts; and
a specifying step of specifying whether to select an amount of offset that has been input in said offset-amount input step or to select an amount of offset that has been stored in said management step,
wherein said acquisition step acquires the amount of offset that has been specified in said specifying step.

8. A computer-readable storage medium storing a computer program for causing a computer to perform a print preview display method for presenting a print preview display of print data that is to be printed, said method comprising:
an acquisition step of acquiring amount of offset of a page in a print preview;
a preview image generating step of generating a print preview image of the print data;
a preview display control method of causing the preview image display, which is generated at said preview image generating step, to be offset and displayed for every sheet of paper in a case where the print data is to be printed on a plurality of sheets of paper, based upon amount of offset acquired at said acquisition step;
an offset-amount input step of inputting the amount of offset of the print preview based upon a designation from a user;
a management step of storing a plurality of offset amounts; and
a specifying step of specifying whether to select an amount of offset that has been input at said offset-amount input step or to select an amount of offset that has been stored in said management step,
wherein said acquisition step acquires the amount of offset that has been specified in said specifying step.

9. The computer program product according to claim 8, said program further having code of an offset-amount input step of inputting amount of offset of the print preview based upon a designation from a user, wherein said acquisition step acquires the amount of offset that has been input at said offset-amount input step.

10. The computer program product according to claim 9, wherein said offset-amount input step is capable of specifying direction and is capable of inputting independent amounts of offset in vertical and horizontal directions.

11. The computer program product according to claim 8, wherein said acquisition step selects and acquires an amount of offset, which is larger than a size of a margin that has been set for the print preview image, from amounts of offset that have been stored by a management unit that is capable of storing a plurality of offset amounts.

12. A computer-readable storage medium storing computer program for causing a computer to perform a print preview display method for presenting a print preview display of print data that is to be printed, said method comprising:
an acquisition step of acquiring an amount of offset of a page in a print preview;
a preview display control step of causing the preview image display, which is generated at said preview image generating step, to be offset and displayed for every sheet of paper in a case where the print data is to be printed on a plurality of sheets of paper, based upon the amount of offset acquired at said acquisition step;
a print setting step of setting a print layout; and
a management step of storing a plurality of offset amounts,
wherein said preview display control step selects an appropriate amount of offset from a plurality of offset amounts, which are stored by a management unit that is capable of storing a plurality of offset amounts, based upon the print layout, and causes the print preview image to be offset and displayed page by page based upon the amount of offset selected.

13. A computer-readable storage medium storing a computer program for causing a computer to perform a print preview display method for presenting a print preview display of print data that is to be printed, said method comprising:
an acquisition step of acquiring an amount of offset of a page in a print preview;
a preview image generating step of generating a print preview image of the print data;
a preview display control step of causing the preview image display, which is generated at said preview image generating step, to be offset and displayed for every sheet of paper in a case where the print data is to be printed on a plurality of sheets of paper, based upon the amount of offset acquired in said acquisition step; and
a print setting step of setting a borderless print setting,
wherein, if borderless printing has been set, said preview display control step selects from said management step an amount of offset that is less than that in a case where borderless printing is not set.

14. A print preview display method for presenting a print preview display of print data that is to be printed, comprising:
an acquisition step of acquiring amount of offset of a page in a print preview;
a preview image generating step of generating a print preview image of the print data;
a preview display control step of causing the preview image display, which is generated at said preview image generating step, to be offset and displayed for every sheet of paper in a case where the print data is to be printed on a plurality of sheets of paper, based upon amount of offset acquired at said acquisition step;
a print setting step of setting a print layout; and
a management step of storing a plurality of offset amounts,
wherein said preview display control step selects an appropriate amount of offset from a plurality of offset amounts, which are stored by a management unit that is capable of storing a plurality of offset amounts, based upon the print layout, and causes the print preview image to be offset and displayed page by page based upon the amount of offset selected.

15. A print preview display method for presenting a print preview display of print data that is to be printed, comprising:
an acquisition step of acquiring amount of offset of a page in a print preview;
a preview image generating step of generating a print preview image of the print data;
a preview display control step of causing the preview image display, which is generated at said preview image generating step, to be offset and displayed for every sheet of paper in a case where the print data is to be printed on a plurality of sheets of paper, based upon amount of offset acquired at said acquisition step; and
a print setting step of setting a borderless print setting,
wherein if borderless printing has been set, said preview display control step selects from said management step an amount of offset that is less than that in a case where borderless printing is not set.

* * * * *